(12) United States Patent
Tsuji et al.

(10) Patent No.: US 11,472,409 B2
(45) Date of Patent: Oct. 18, 2022

(54) VEHICLE CONTROL APPARATUS

(71) Applicant: HONDA MOTOR CO., LTD., Tokyo (JP)

(72) Inventors: Kanta Tsuji, Wako (JP); Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 464 days.

(21) Appl. No.: 16/675,586

(22) Filed: Nov. 6, 2019

(65) Prior Publication Data

US 2020/0207346 A1 Jul. 2, 2020

(30) Foreign Application Priority Data

Dec. 28, 2018 (JP) .............................. JP2018-247961

(51) Int. Cl.
*B60W 30/16* (2020.01)
*B60W 30/12* (2020.01)
*B60W 60/00* (2020.01)

(52) U.S. Cl.
CPC ............ *B60W 30/16* (2013.01); *B60W 30/12* (2013.01); *B60W 60/0053* (2020.02)

(58) Field of Classification Search
CPC .. B60W 30/16; B60W 30/12; B60W 60/0053; B60W 60/0059; B60W 2552/30; B60W 2554/4046; B60W 30/165; B60W 30/17; B60W 60/005; B60W 60/0055; B60W 2554/4045

See application file for complete search history.

(56) References Cited

U.S. PATENT DOCUMENTS

| 9,937,955 | B2 | 4/2018 | Ueda et al. | |
|---|---|---|---|---|
| 2005/0273215 | A1* | 12/2005 | Kuge | B60T 8/17551 701/1 |
| 2016/0257342 | A1* | 9/2016 | Ueda | B62D 15/026 |
| 2017/0052540 | A1* | 2/2017 | Lokesh | B60W 30/165 |
| 2018/0093675 | A1* | 4/2018 | Holub | A61B 5/18 |

(Continued)

FOREIGN PATENT DOCUMENTS

| JP | 2016-004445 A | 1/2016 |
|---|---|---|
| JP | 2016-162196 A | 9/2016 |
| JP | 2018-076012 A | 5/2018 |

OTHER PUBLICATIONS

Japanese Office Action (with partial translation) for Japanese Patent Application No. 2018-247961 dated Jun. 11, 2021.

*Primary Examiner* — Abby Y Lin
*Assistant Examiner* — Dylan M Katz
(74) *Attorney, Agent, or Firm* — Thomas | Horstemeyer, LLP

(57) ABSTRACT

A vehicle control apparatus is provided. The apparatus comprises a controller that performs following control of following the preceding vehicle based on the peripheral information. The controller controls traveling of a self-vehicle by setting one of a first state which requires driving preparation by a driver and a second state which does not require the driving preparation by the driver, controls the self-vehicle by setting the first state if a behavior amount of the preceding vehicle exceeds a threshold; and controls the vehicle by setting the second state if the behavior amount of the preceding vehicle does not exceed the threshold, and changes the threshold based on the peripheral information.

9 Claims, 7 Drawing Sheets

(56) References Cited

U.S. PATENT DOCUMENTS

2019/0092330 A1\* 3/2019 Ide ....................... G01S 13/867
2020/0231151 A1\* 7/2020 Aoki .................... G05D 1/0246
2020/0317192 A1\* 10/2020 Awane ................. B60W 30/10

\* cited by examiner

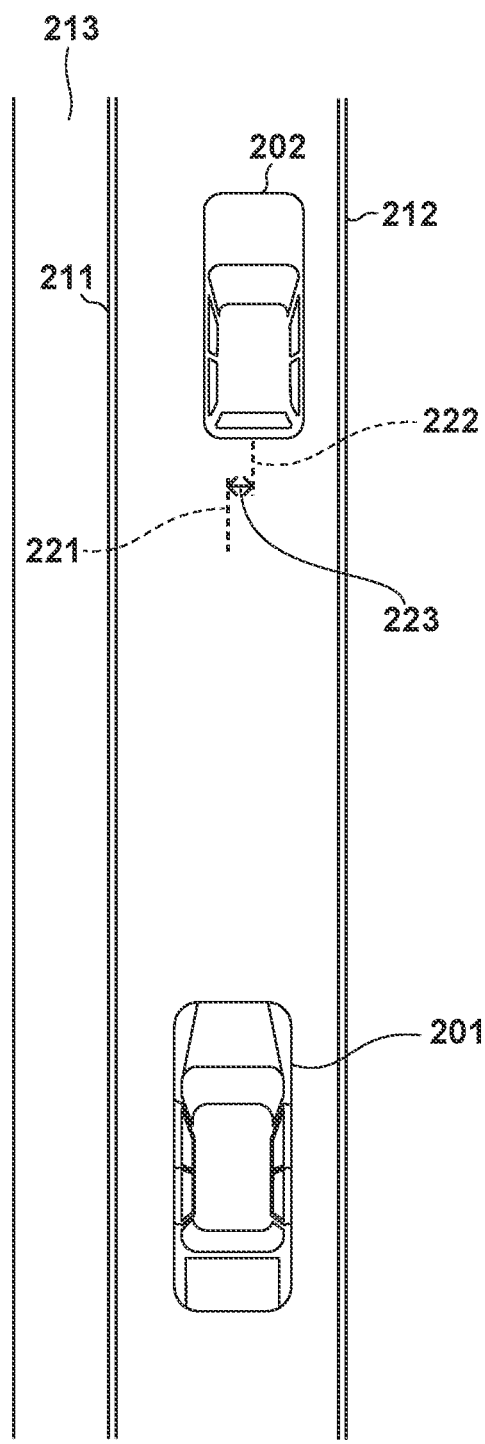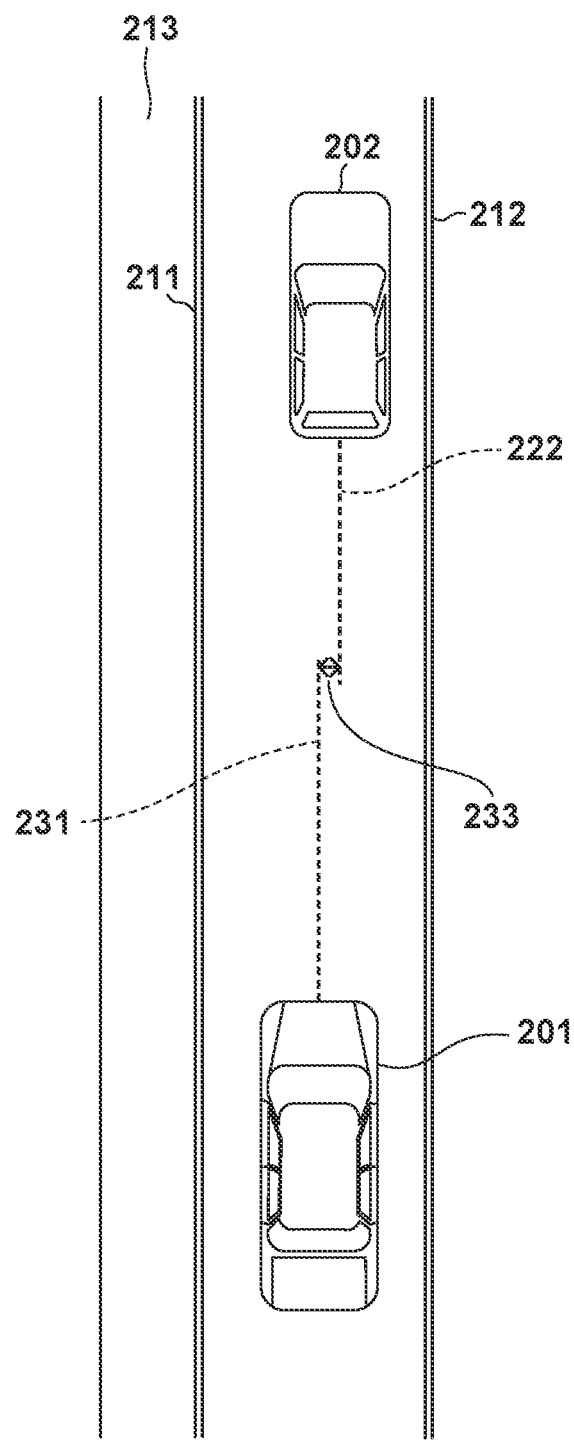

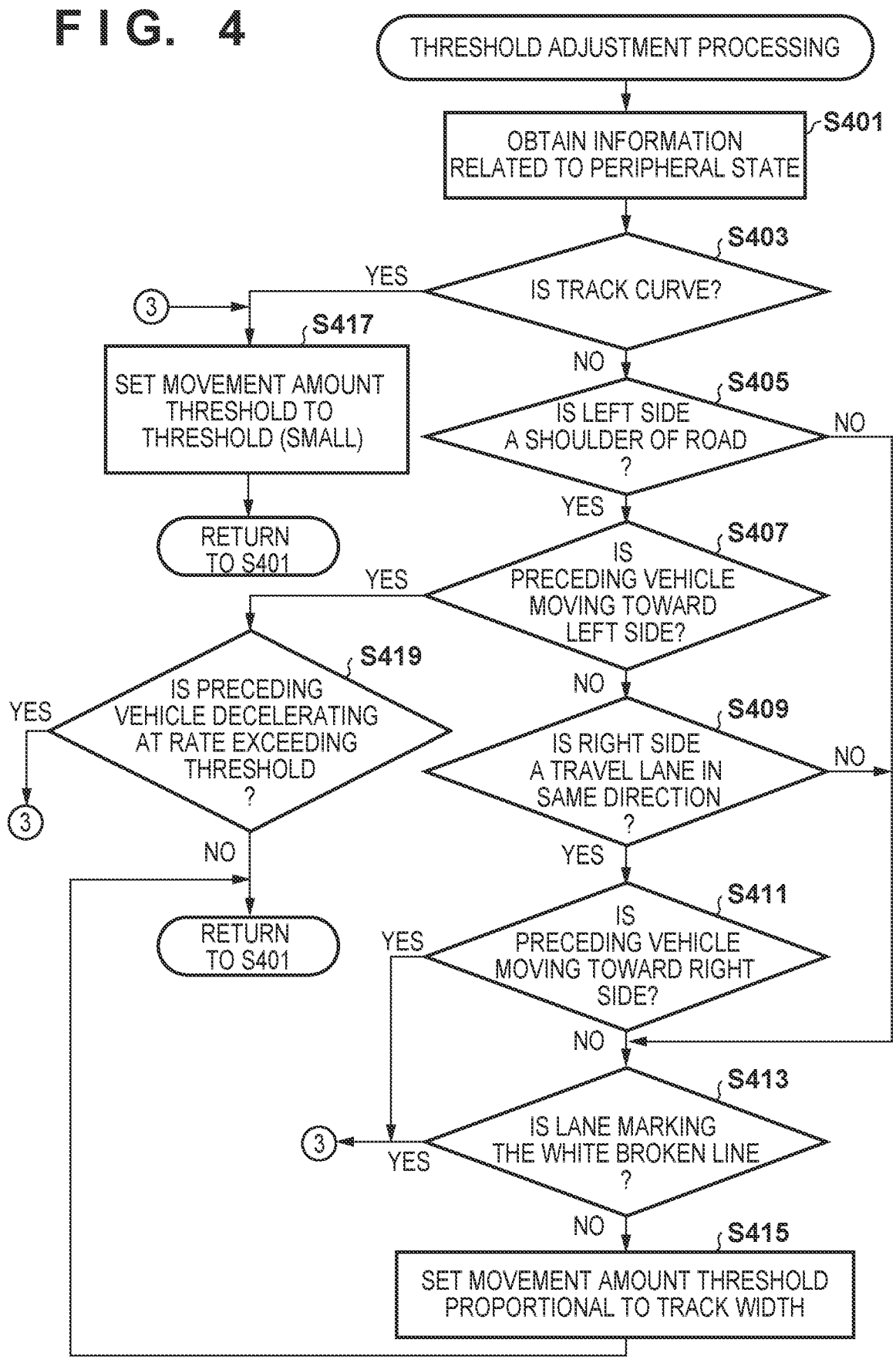

VEHICLE CONTROL APPARATUS

CROSS-REFERENCE TO RELATED APPLICATION(S)

This application claims priority to and the benefit of Japanese Patent Application No. 2018-247961 filed on Dec. 28, 2018, the entire disclosure of which is incorporated herein by reference.

BACKGROUND OF THE INVENTION

Field of the Invention

The present invention relates to a vehicle control apparatus for controlling an automobile, and more specifically to a preceding vehicle following control technique.

Description of the Related Art

Automated driving of a vehicle is implemented by executing travel planning to detect the peripheral environment of the vehicle and determine a track on which the vehicle is to travel based on the detection result, and executing driving control to cause the vehicle to actually travel on the determined track. For example, the vehicle can be controlled by automated driving so that the vehicle will follow the preceding vehicle and travel along the track on which the preceding vehicle is traveling.

In the case of preceding vehicle following control, if the preceding vehicle is to move in a lateral direction (vehicle width direction of the vehicle), the following vehicle will move in the lateral direction in accordance with the movement of the preceding vehicle. That is, for example, if the preceding vehicle is to move to the side of an oncoming lane, the vehicle can move to the side of the oncoming lane in accordance with the preceding vehicle. In contrast, Japanese Patent Laid-Open No. 2016-162196 discloses a method in which the vehicle following control is ended when the preceding vehicle is to move beyond the lane boundary line.

SUMMARY OF THE INVENTION

There are several automation levels in automated driving, and the automation level may be switched even while a vehicle following travel operation is being executed. Since it may be difficult for a driver to immediately respond if the vehicle following control suddenly ends when a lateral-direction movement of the preceding vehicle is detected, an operation to alert the driver is performed in accordance with the automation level and the automation level is decreased. On the other hand, if the preceding vehicle is traveling stably, the automation level is increased to a level that will allow the preceding vehicle following travel operation to be performed.

Since a vehicle will move in the lateral direction depending on the travel environment, and a lateral movement may occur frequently depending on the travel environment. In such a case, the automation level will change frequently in accordance with the lateral movement of the preceding vehicle. Such automation level change is accompanied by an operation to alert the driver, and this can be burdensome for the driver as well as cause a sense of discomfort for the occupants, including the driver, of the vehicle.

In the present invention, a driver is alerted appropriately in an automated-driving vehicle that performs control to follow a preceding vehicle. This will reduce the sense of burden and discomfort felt by a user of the vehicle.

The present invention includes the following arrangement. That is, there is provided a vehicle control apparatus comprising: an obtainment unit configured to obtain peripheral information which includes at least one of a lateral movement of a preceding vehicle, a shape of a road, a state of a road adjacent to the road, and lane markings; and a controller configured to perform following control of following the preceding vehicle based on the peripheral information, wherein the controller controls traveling of a self-vehicle by setting one of a first driving state which requires driving preparation by a driver and a second driving state which does not require the driving preparation by the driver, controls the self-vehicle by setting the first driving state if a behavior amount of the preceding vehicle exceeds a predetermined threshold, and controls the vehicle by setting the second driving state if the behavior amount of the preceding vehicle does not exceed the predetermined threshold, and changes the predetermined threshold based on pieces of information indicating the shape of the road on which the self-vehicle is traveling, the state of the road adjacent to the road, and one of lane reduction and width reduction of the road or based on at least one of these pieces of information.

According to the present invention, a driver can be alerted appropriately in an automated-driving vehicle that performs control to follow a preceding vehicle. This can reduce the sense of burden and discomfort felt by the user of the vehicle.

BRIEF DESCRIPTION OF THE DRAWINGS

FIGS. 2A and 2B are explanatory views showing an example of a vehicle following travel operation;

FIG. 4 is a flowchart showing lateral movement threshold setting processing according to the first embodiment;

DESCRIPTION OF THE EMBODIMENTS

Figure 1:
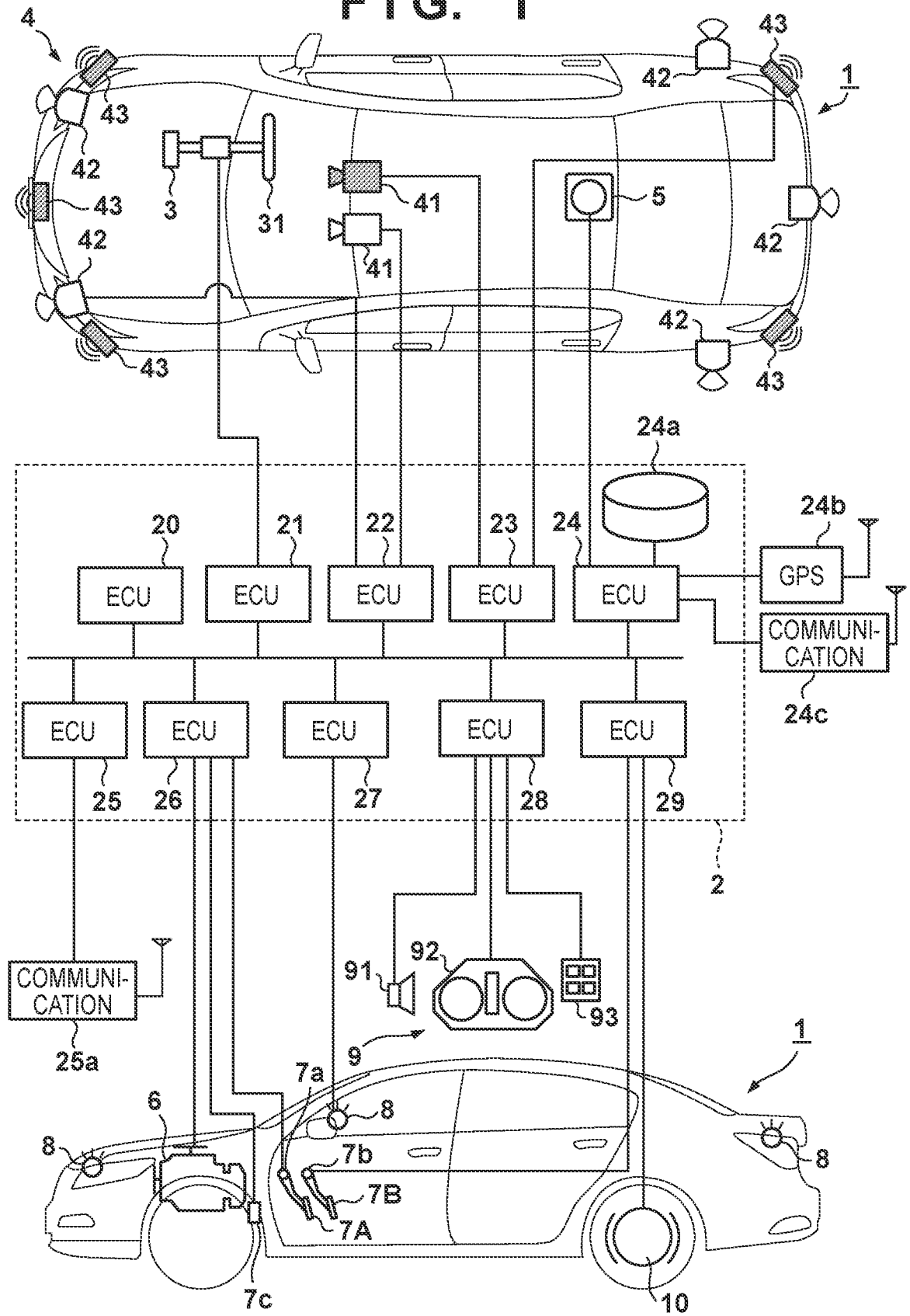
FIG. 1 is a block diagram of a vehicle control apparatus according to an embodiment.

Embodiments will be described in detail hereinafter with reference to the accompanying drawings. It should be noted that the following embodiments are not intended to limit the scope of the appended claims, and that not all the combinations of features described in the embodiments are necessarily essential to the present invention. Of a plurality of features described in the embodiments, two or more features may be combined arbitrarily. In addition, the same reference numerals denote the same or similar parts, and a repetitive description will be omitted.

In addition, the following embodiments assume that a vehicle is to travel on the left side. That is, in other words, the right side is the side of an oncoming lane and the left side is the side of the shoulder of a road. Hence, under a traffic environment in which a vehicle is to travel on the right side, the left side will be the side of the oncoming lane and the right side will be the side of the shoulder of the road, and the following embodiments should be read by swapping the denotations for right and left in such a case.

First Embodiment

Arrangement of Automated-Driving Vehicle

An embodiment of the present invention will be described hereinafter with reference to the accompanying drawings.

FIG. 1 shows a block diagram of a vehicle control apparatus for controlling a vehicle 1 according to an embodiment of the present invention. Note that although an explanation will be given assuming that the vehicle control apparatus is included in the vehicle 1, the vehicle control apparatus may be present outside the vehicle 1 and may control the vehicle 1 by communicating with the vehicle 1. In FIG. 1, the outline of the vehicle 1 is shown by a plan view and a side view. The vehicle 1 is, for example, a sedan-type four-wheeled vehicle. Note that the vehicle 1 may be a vehicle other than a four-wheeled vehicle such as a two-wheeled vehicle or the like.

The vehicle control apparatus shown in FIG. 1 includes a control unit 2. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 executes control associated with automated driving of the vehicle 1. In automated driving, at least one of steering and acceleration/deceleration of the vehicle 1 is automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of the travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the roof front of the vehicle 1. When images captured by the cameras 41 are analyzed, the contour of a target or a division line (a white line or the like) of a lane on a road can be extracted.

The detection unit 42 is a light detection and ranging (LIDAR) (to be sometimes referred to as the LIDAR 42 hereinafter), and detects a target around the vehicle 1 or measures the distance to a target. In this embodiment, five detection units 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each detection unit 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Although not shown, the vehicle 1 includes, other than the components described above, a steering wheel grip sensor that detects that the driver is gripping the steering wheel 31 and a driver monitor that specifies the direction of the line of sight by capturing an image of the face of the driver to detect that the driver is monitoring the front or the periphery of the vehicle. For example, the ECU 20 can determine whether the driver is executing required tasks (the periphery monitoring task or the steering wheel gripping task) corresponding to the automated driving level from the detection results of the monitor and the sensors.

Outline of Vehicle Following Travel Control

In the vehicle control apparatus according to this embodiment, the ECU 20 executes control related to automated driving of the vehicle 1 based on the peripheral environment information obtained by at least one of the cameras 41, the LIDARs 42, and the radars 43. In this embodiment, the vehicle 1 travels by following a preceding vehicle traveling on the same lane. That is, the vehicle 1 executes acceleration/deceleration and steering control so as to travel along a track traveled by the preceding vehicle. In a case in which the preceding vehicle exceeds a predetermined threshold and moves in a lateral direction (the left-and-right direction or the vehicle width direction intersecting the direction of travel of the vehicle) or in a case in which such a movement is predicted while this vehicle following control is being performed, the vehicle 1 will request the driver to execute, for example, predetermined tasks such as periphery monitoring task, a steering wheel gripping task, and the like. Note that the vehicle 1 may reduce the automated driving level instead of or in addition to requesting the execution of these kinds of predetermined tasks. In this example, assume that tasks will be requested at the time of the reduction of the automated driving level. In this case, at least the vehicle following control in the lateral direction will be continued until the end of the preceding vehicle following control is determined. Since it can be expected that the vehicle will shift to a state in which the vehicle following control will end when it is detected or predicted that the preceding vehicle will move in the lateral direction beyond the predetermined threshold, the above-described operation is performed to cause the driver to take a predetermined set of actions in advance. As a result, even if the preceding vehicle continues the lateral movement and makes a lane change or the like, the vehicle following control can be ended and the control can be smoothly transferred to the driver because the driver will already be in a state in which he/she is executing the periphery monitoring task, the steering wheel gripping task, and the like.

On the other hand, it is possible to assume that the preceding vehicle will ultimately return to the current travel lane, for example, in a case in which the preceding vehicle has moved laterally to avoid an obstacle or the like. In this case, since the preceding vehicle following control will be continued, control to move the vehicle 1 in the lateral direction in accordance with the preceding vehicle will be executed. As a result, since the vehicle 1 will be driven automatically although the driver has executed the predetermined tasks or the automated driving level has been reduced, only a sufficiently small driving load is placed on the driver, and thus the overall driving load of the driver can be suppressed. In addition, for example, even in a case in which there is an obstacle that cannot be avoided by the vehicle following control, the driver can recognize and avoid the obstacle because the driver will be monitoring the periphery and gripping the steering wheel. Note that a lateral movement amount of the preceding vehicle from a predetermined reference position in the road width direction will be determined, and the value of this determined lateral movement amount will be used as the predetermined threshold in this embodiment. The position to be set as the reference may be, for example, the midpoint between the lane boundary lines (to be also referred to as lane markings) determining the lane or a position at the center of the width direction the preceding vehicle. Alternatively, the reference position may also be set as a position at a predetermined distance from one of the lane boundary lines as set a reference. In addition, track boundaries determined by roadside plantings, guard rails, and the like may be used instead of the lane boundary lines. Furthermore, in this embodiment, an appropriate automated driving level change is implemented without setting a fixed threshold by changing the threshold in accordance with the peripheral environment of the road currently traveled by the vehicle or the like so that the driver will be alerted early, but also frequent alerts will be suppressed.

FIGS. 2A and 2B show states in which preceding vehicle following control is performed. FIG. 2A shows an example of a case in which the center of the lane has been adopted as the reference position. The travel lane is defined by a lane boundary line 211 on the left side and a lane boundary line 212 on the right side. A shoulder 213 of the road is on the left side of the lane boundary line 211, and an adjacent travel lane in the same direction is present on the right side of the lane boundary line 212. However, there may be a case in which an adjacent lane is present instead of the shoulder 213 or a case in which an oncoming lane or a shoulder is present to the right of the lane boundary line 212. A vehicle 201 (to be also referred to as following vehicle 201 hereinafter) is an automated-driving vehicle that has the arrangement shown in FIG. 1 and is executing preceding vehicle following control on a vehicle 202 (to be also referred to as the preceding vehicle 202) that is traveling ahead. In FIG. 2A, a reference position 221 of the lateral movement of the preceding vehicle 202 is a position at the center of the road width, that is, the midpoint between the lane boundary line 211 and the lane boundary line 212. To obtain this position, for example, the left and right lane boundary lines (to be also referred to as boundary lines hereinafter) can be specified from images obtained by the cameras 41 and a midpoint between these two lines can be determined. Note that a distance between two points in an image captured by each camera 41 can be specified if the distance to each point can be obtained. Hence, the distance to the rear end of the preceding vehicle 202 is measured by using the radars 43 or the like and the center of the vehicle width of the preceding vehicle 202 is specified in the image to specify the lateral movement amount of the preceding vehicle 202 with respect to the reference position. Note that in order to determine the reference position 221, for example, the lane width of the position where the vehicle is traveling may be obtained from map information, and a position shifted from one of the left or right lane boundary lines toward the direction of the center of the lane by half the distance of the lane width may be set as the reference position. In this manner, a difference between the reference position and a center position 222 (to be also referred to as a preceding vehicle position hereinafter) in the width direction of the preceding vehicle is specified as a lateral movement amount 223 of the preceding vehicle. Vehicle following travel control such as an operation to change the automated driving level is performed by comparing this amount with a threshold.

FIG. 2B shows an example in which the center position of the width direction of the following vehicle 201 is adopted as the reference position of lateral movement. For example, in an image captured by each camera 41, the center position of the width direction of the following vehicle 201 can be specified in correspondence with the distance from the installation position of the camera to the rear end of the preceding vehicle 202 which is the center position determination target. For example, if each camera 41 is installed facing the front (straight direction) at the center of the width direction of the vehicle body, the centerline in the lateral direction of the captured image corresponds to the center of the width direction of the following vehicle 201. In addition, if the attachment position of each camera 41 is offset laterally from the center of width direction of the vehicle, the distance to the preceding vehicle 202 and the offset amount of each camera 41 can be used to specify a position obtained by extending the center of the following vehicle 201 frontward on the image. This position is a reference position 231 in FIG. 2B, and a lateral movement amount 233 of the preceding vehicle 202 can be determined based on this position as a reference.

Vehicle Following Control

Figure 3:
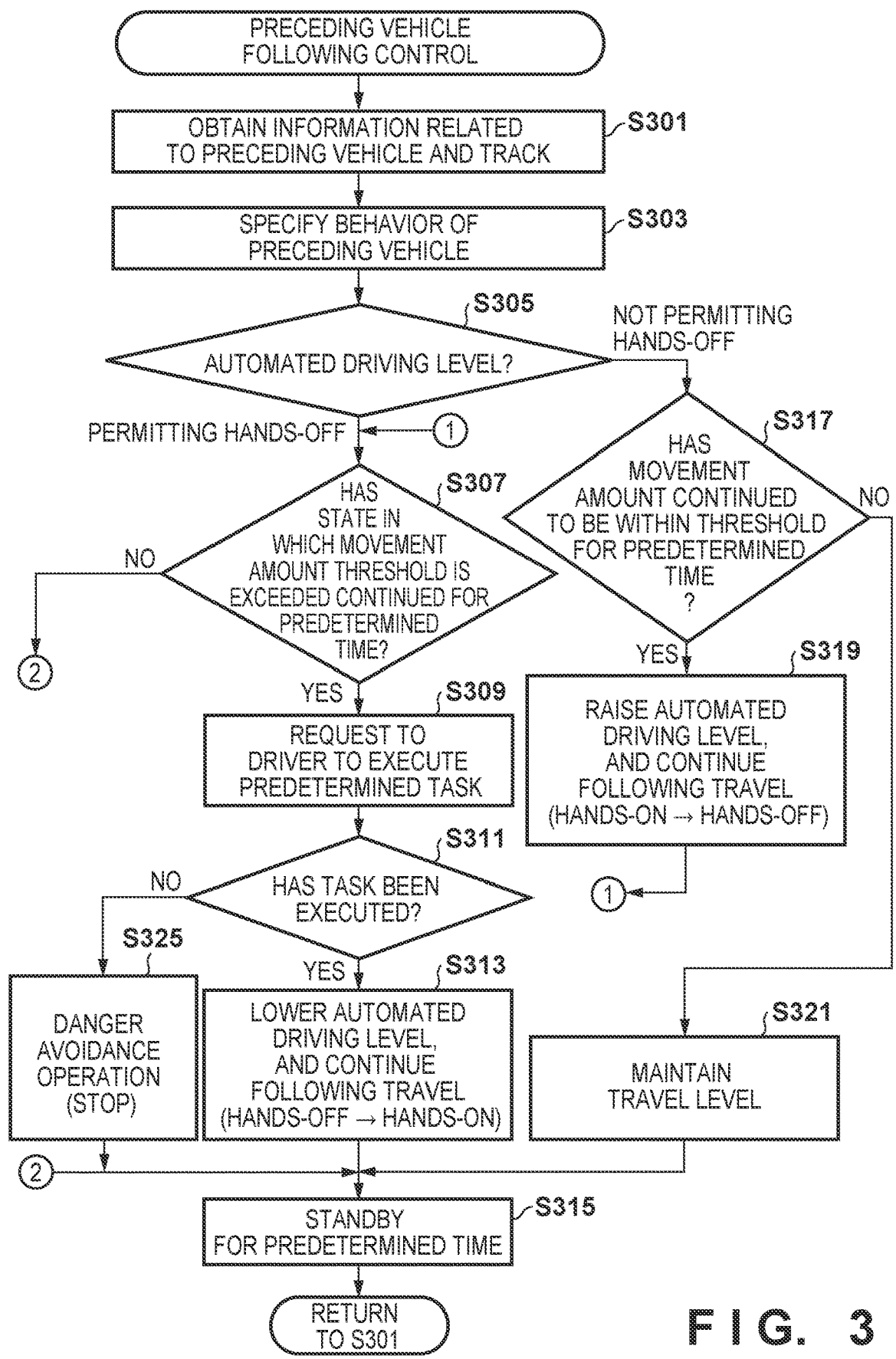
FIG. 3 is a flowchart showing travel control processing.

FIG. 3 shows an example of the procedure of the vehicle following control executed by, for example, the ECU 20. In this embodiment, assume that a vehicle following travel operation is performed in two automated driving levels as the premise of FIG. 3. One level is a level that permits a "hands-off state" (to be also referred to as a high level or a second driving state) in which the driver is allowed to take his/her hands off the steering wheel, and the other level is a level that permits a "hands-on state" (to be also referred to as a low level or a first driving state) in which the driver is required to hold the steering wheel. Although even lower levels are further included in the automated driving levels, vehicle following driving is not performed in those levels. Note that the determination of a hands-on state is performed based on a detection signal of the steering wheel grip sensor described above. In the first driving state, the hands-on state is requested and preparation for driving is required on the part of the driver so that the driver can immediately take over the driving operation. On the other hand, in the second driving state, the hands-off state is permitted and the driver does not need to immediately take over the driving operation.

First, information related to the preceding vehicle and the track are obtained (step S301). The information to be obtained includes, for example, image data captured by the cameras 41, map information obtained from the server, the distance information to the preceding vehicle obtained by the radars 43, and the like. In particular, the preceding vehicle and the lane boundary lines are important in the image data, and these objects are identified from the images. Subsequently, the behavior of the preceding vehicle is specified based on the obtained information (step S303). This example will particularly focus on a behavior related to a movement in the road width direction, that is, lateral movement. Thus, based on the obtained information the reference position 221 (the center of the travel lane) or the reference position 231 (the center of the following vehicle 201) is specified in the image to specify the distance to the center position 222 of the preceding vehicle. This distance will be referred to as the lateral movement amount or simply the movement amount.

Next, the current automated driving level is determined (step S305). If the automated driving level is set to the high level, that is, the level permitting the hands-off state, the process branches to step S307. On the other hand, if the automated driving level is set to the low level, that is, the level not permitting the hands-off state, the process branches to step S317. If the automated driving level is determined to be set to the high level, it is determined whether the movement amount exceeds the threshold and whether this exceeding state has been continuing for a predetermined time (step S307). To implement this determination, for example, a counter or the like that indicates the continuation time will be arranged, and a standby time (to be described later in the process of step S315) will be added to this counter when the movement amount has exceeded a threshold. Subsequently, this counter will be reset to zero if the movement amount is within the threshold. In step S307, if it is determined that the movement amount exceeds the threshold and that the value of this counter has exceeded a predetermined time, the process branches to step S309. The predetermined time may be, for example, 1 sec or a few sec. Also, the threshold that is to be compared with the movement amount may be provided based on a standard value, such as 90 cm or the like, by the procedure described later in FIGS. 4 to 6B. Note that although FIG. 3 forms a processing loop, it can be executed in a multi-tasking environment so that the ECU 20 can execute other tasks in parallel at step S315 or other non-critical timings.

In a case in which the movement amount has exceeded the threshold for a predetermined time, the vehicle will issue a request to the driver to execute a predetermined task so that the automated driving level can be lowered (step S309). This task is, for example, for setting the hands-on state by requesting the driver to grip the steering wheel. In addition, this request can be implemented by, for example, a voice output, a display output, seat vibration, or the like. Subsequently, it is determined whether the driver has executed the task (step S311). Since the execution of the task requires a predetermined time, it is preferable to repeat the process of step S311 for a predetermined time and determine whether the task has been executed within this predetermined time. The automated driving level is lowered and shifted to a level that requires the hands-on state if the task has been executed. In the level that requires the hands-on state, the steering wheel grip sensor can be used to continuously check whether the driver is gripping the steering wheel. The vehicle following travel operation will be continued in this case. On the other hand, if the task is not executed within the predetermined time, a danger avoidance operation will be executed (step S325). The danger avoidance operation is executed by, for example, causing the vehicle to stop its travel on the lane or causing the vehicle to pull over to the shoulder of the road if the shoulder can be detected. Subsequently, a standby operation is executed for a predetermined time and the process is repeated from step S301 (step S315). The predetermined time may be set to, for example, 0.1 sec or the like. Note that if it is determined that the driver is not gripping the steering wheel while the vehicle is traveling in the automated driving level requiring the hands-on state, a warning can be issued to the driver, and the danger avoidance operation can be performed if the driver does not comply with the warning.

On the other hand, if it is determined in step S305 that the automated driving level is set to the low level which does not permit the hands-off state, whether the movement amount of the preceding vehicle has continued to be within a threshold for a predetermined time is determined (step S317). Although this determination is different in the point that the movement amount is set to be within the threshold, this determination can be implemented in the same manner as the process of step S307 by changing the wording "exceed the threshold" to "within the threshold". If it is determined that the movement amount of the preceding vehicle continues to be within the threshold for the predetermined time, the automated driving level is raised and shifted to the high level in which the hands-off state is permitted (step S319). In the high level, the vehicle following travel operation is continued even if the steering wheel grip sensor detects that the driver is not gripping the steering wheel. Subsequently, the process shifts to step S307, and the vehicle following travel control corresponding to a new automated driving level is executed. On the other hand, in step S317, if it is determined that the movement amount of the preceding vehicle has not continued to be within the threshold for the predetermined time, the current travel level will be maintained (step S321). Subsequently, the process branches to step S315.

Note that FIG. 3 shows control that is performed based on a premise that the vehicle following control is already being performed. In a case in which the vehicle following control is to be started from a state in which the vehicle following control is not being performed, the vehicle following control can be started upon setting, in step S319, the automated driving level to a level in which the hands-on state will be required and the vehicle following control will be executed. The control to increase or decrease the automated driving level to execute the vehicle following control is performed in the manner described above.

Setting of Lateral Movement Threshold

FIG. 4 is a flowchart showing the procedure for setting the threshold which is referred in the processes of steps S307 and S317 of FIG. 3. The procedure of FIG. 4 can be executed in parallel to, for example, the procedure of FIG. 3 executed by the ECU 20. First, the state of the periphery is obtained (step S401). In this step, although pieces of information similar to those obtained in step S301 of FIG. 3 can be acquired, the information of interest is different from that in step S301 of FIG. 3. In this step, for example, pieces of information such as the curvature of the curve on which the vehicle is currently traveling, whether the curve is a right curve or a left curve, whether the shoulder of the road is present on the left side of the lane, and the like are set as the information of interest. In addition, pieces of information such as whether the lateral movement of the preceding vehicle is toward the right or the left, the type of the lane boundary lines (also referred to as the lane markings), and the like that can be obtained from the image data are also set as the information of interest.

Next, whether the current track is a curve is determined first (step S403). For example, the track will be determined to be a curve if the curvature of the road is equal to or more than a predetermined value. The curvature of the road can be obtained from the map information. Alternatively, the curvature of the road may be determined based on the contour (for example, the track between a guard rail and another guard rail) of the road by detecting the contour of the road from the point sequence data obtained by LIDAR. Alternatively, the curvature obtained when the lane boundary lines are projected onto a flat surface based on the distribution of the road surface distances specified from the image captured by the cameras and the radars 43 may be calculated. In addition, the predetermined value which is to serve as the determination threshold may be a value obtained by empirically obtaining a curvature of a degree that tends to cause the vehicle to be closer to the inner side of the curve while traveling. Furthermore, not only the curvature, but also the distance in which the curvature continues can be added as a reference to be used for the determination. For example, it can be considered that, even in a state in which the curvature of the road on which the vehicle is currently traveling exceeds a predetermined curvature, the lateral movement accompanying the curve will be small if the distance of the curve is small. Hence, the distance in which the curve continues is obtained from the map information, and the curvature may be determined to be a curve if the curvature exceeds a predetermined curvature and the distance of this curvature exceeds a predetermined distance. Note that the radius of the curve will become smaller as the curvature increases.

In step S403, if it is determined that the road on which the vehicle is currently traveling on is a curve, the lateral movement amount threshold is set to a threshold (small) (step S417). Subsequently, the process returns to step S401. The threshold (small) is a threshold which is smaller than the standard threshold. For example, if the standard threshold value (to be indicated as a threshold (standard) hereinafter) is 0.9 m, the threshold (small) may be, for example, 0.5 m which is about half of this standard threshold value. These numerical values are merely an example, and the standard value can be changed in accordance with the width of the road on which the vehicle is to travel, the width of the vehicle, or the like, as a matter of course. Reducing the threshold will increase the sensitivity toward the lateral movement, thus meaning that it will be easier to reduce the automated driving level in accordance with the lateral movement of the preceding vehicle. Since the vehicle tends to move laterally toward the center while traveling on a curve, it can be considered that this tendency will increase as the curvature becomes larger. Hence, in the case of a curve with a large curvature (that is, a curve with a small radius), the reduction of the automated driving level will be caused by a smaller lateral movement than in the case of a straight line. As a result, the possibility of the lane departure of the preceding vehicle can be detected earlier, and an unintended vehicle following operation can be prevented.

On the other hand, in step S403, if it is determined that the road on which the vehicle is currently traveling on is not a curve, it is determined whether the shoulder of the road is present on the left side of the lane on which the vehicle is currently traveling on (step S405). This determination can be performed based on, for example, the map information. If it is determined to be the shoulder of the road, it is determined whether the preceding vehicle is moving toward the left side (step S407). In this case, for example, if it is detected that the center position 222 of the preceding vehicle has shifted toward the left from the reference position 221 or 231, it can be determined that the preceding vehicle is moving toward the left side. Alternatively, the determination may be made by measuring a temporal shift. For example, it may be determined that the preceding vehicle is moving toward the left side if the lateral movement amount over a predetermined period gradually increases toward the left side. If it is determined in step S407 that the preceding vehicle is moving toward the left side, it will be determined whether the preceding vehicle is decelerating at a deceleration that exceeds a predetermined value (step S419). This determination can be performed based on the speed of the preceding vehicle measured by, for example, the radars 43. If it is determined that the preceding vehicle is decelerating at a deceleration that exceeds the predetermined value, the lateral movement amount threshold is set to the threshold (small) (step S417). As a result, in a state in which it can be predicted that the vehicle will stop in the shoulder of the road, it is possible to alert the driver early and prepare for the end of the vehicle following travel operation. In step S419, if it is determined that the preceding vehicle is not decelerating at a deceleration that exceeds the predetermined value, the process returns to step S401.

In step S407, if it is not determined that the preceding vehicle is moving toward the left side, it is determined whether the right side of the current lane is a travel lane in the current travel direction (step S409). If it is determined that the lane on the right side of the current lane is a travel lane in the current travel direction, it will be determined whether the preceding vehicle is moving toward the right side (step S411). This determination can be performed by performing the process in the same manner as the process in step S407 upon switching the left and right in the process. If it is determined that the preceding vehicle is moving toward the right side, the lateral movement amount threshold is set to the threshold (small) (step S417). As a result, it becomes possible to predict the lane change of the preceding vehicle early and to alert the driver to cause the driver to respond accordingly.

If it is determined that the preceding vehicle is not moving toward the right side in step S411, the type of each of the left and right lane markings is determined (step S413). If one of the left and right lane markings is the white broken line, the process is branched to step S417, and the lateral movement amount threshold is set to the threshold (small). As a result, it becomes possible to predict the lane change of the preceding vehicle early and to alert the driver to cause the driver to respond accordingly. Note that in this case, the lateral movement amount threshold can be set separately for the left side and the right side, and the lateral movement amount threshold of the side determined to have the white broken line as the lane marking may be set to the threshold (small).

If it is determined in step S413 that the lane markings of both the left and the right sides are markings other than the white line, the lateral movement amount threshold is set to a value corresponding to the track width, that is, the lane width between the left and right lane markings (step S415). For example, if the lane width has a standard lane width (for example, 3.5 m), the standard lateral movement amount threshold (for example, 0.9 m) will be set. Subsequently, a lateral movement amount threshold proportional to the lane width may be set by using this standard lateral movement amount threshold as a reference. As a result, the amount of tolerance of lateral movement can be increased when the vehicle is traveling on a wide lane, and the amount of tolerance of the lateral movement can be decreased when the vehicle is traveling on a narrow lane.

According to the arrangement and the procedures described above, in this embodiment, the threshold is set so that the automated driving level will not be lowered in a case in which the preceding vehicle has to move laterally even though the preceding vehicle has an intention to travel on the same lane. In contrast, in a case in which there is a possibility that the preceding vehicle has an intention to change lanes or make a stop, it will be possible to detect this intention as soon as possible and alert the driver. The alerted driver can hold the steering wheel and prepare to manually override the automated driving operation or to switch to manual driving.

Second Embodiment

Figure 5A:
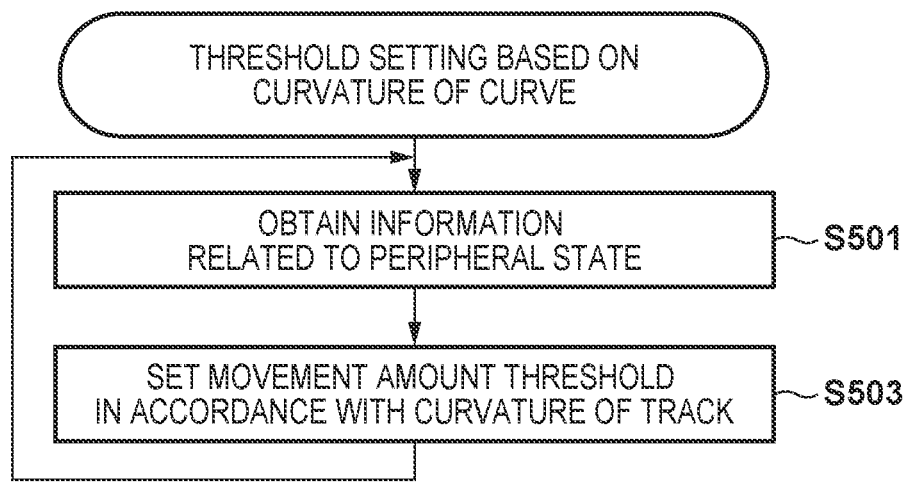
FIG. 5A is a flowchart showing lateral movement threshold setting processing according to the second embodiment.

The second embodiment differs from the first embodiment in the way in which the lateral movement amount threshold is set. In this embodiment, the lateral movement amount threshold is determined by adopting, among the reference determination processes performed in the procedure of FIG. 4 according to the first embodiment, the curvature of a curve as a reference. FIG. 5A shows the procedure of threshold determination based on the curvature of the curve as a reference. Although a large or small lateral movement amount threshold is determined by comparing the curvature of a curve on which the vehicle is to travel with a predetermined curvature in FIG. 4, the lateral movement amount threshold is determined (step S503) in accordance with the curvature of the curve on which the vehicle is to travel upon obtaining (step S501) the information related to the peripheral state in FIG. 5A. For example, the association between the curvature and the threshold can be determined in advance, and the lateral movement amount threshold can be determined based on the curvature of the curve to be traveled and the predetermined association. In the association, for example, a smaller threshold can be set as the curvature of the curve becomes larger so that the automated driving level will be lowered with respect to the lateral movement of the preceding vehicle. In this manner, lane departure that occurs when the vehicle travels a curve can be detected earlier, and the driver can prepare for the adjustment of the line of travel by manual driving or the end of the vehicle following travel operation. Note that since FIGS. 1 to 3 are same as those of the first embodiment, a description has been omitted.

Third Embodiment

Figure 5B:
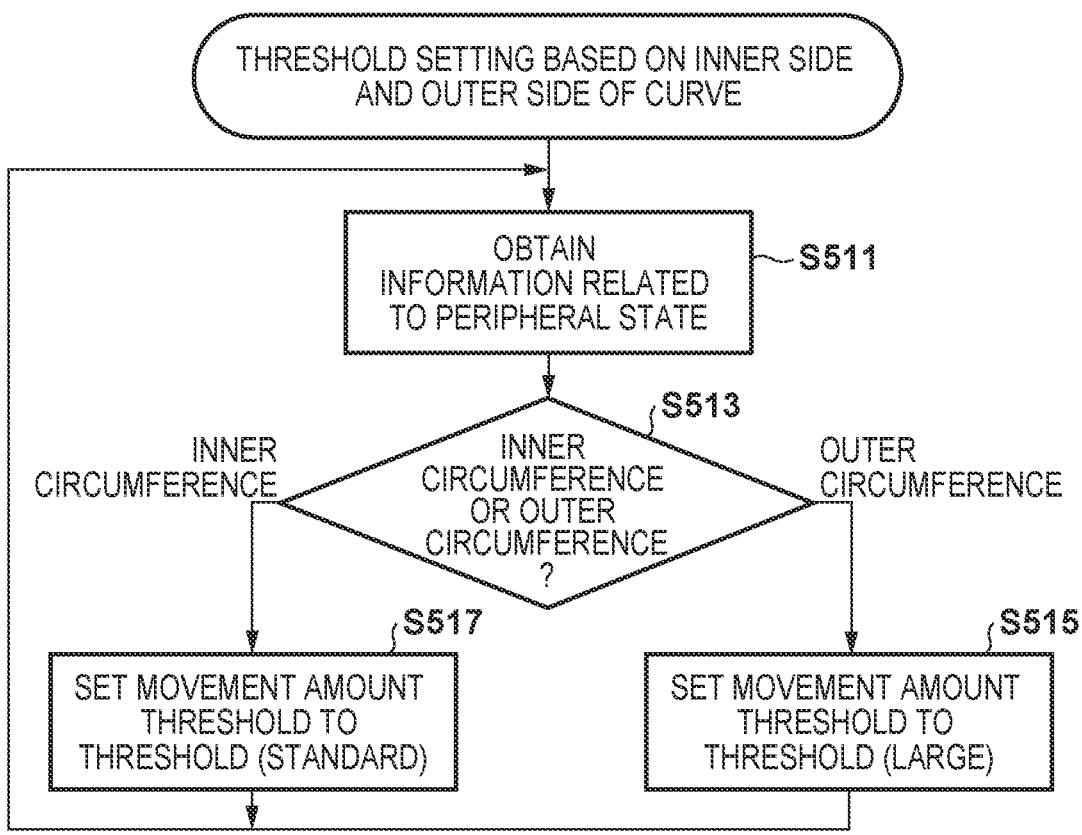
FIG. 5B is a flowchart showing lateral movement threshold setting processing according to the third embodiment.

The third embodiment differs from the first embodiment in the way in which the lateral movement amount threshold is set. In this embodiment, the lateral movement amount threshold is determined by adopting, among the reference determination processes performed in the procedure of FIG. 4 according to the first embodiment, the inner side and the outer side of a curve as a reference. FIG. 5B is a flowchart showing the procedure of threshold determination based on the inner side and the outer side of the curve as a reference. In FIG. 5B, the process of step S511 corresponding to the process of step S401 of FIG. 4 is executed, and subsequently, whether the lane on which the vehicle is currently traveling is on the outer circumference side or on the inner circumference side of the curve is determined (step S513). This determination can be performed based on the map information and the current direction of travel. If the vehicle is currently traveling on a lane on the outer circumference side, that is, the outer side of the arc of the curve, a threshold (large) which is larger than the standard threshold is set as the lateral movement amount threshold (step S515). As a result, the sensitivity toward the lateral movement is reduced in the automated driving level change setting. On the other hand, if the vehicle is currently traveling on a lane on the inner circumference side of the curve, the threshold (standard) is set as the lateral movement amount threshold (step S517). In this manner, lane departure that occurs when the vehicle travels a curve can be detected earlier, and the driver can prepare for the adjustment of the line of the travel by manual driving or the end of the vehicle following travel operation. Note that since FIGS. 1 to 3 are same as those of the first embodiment, a description has been omitted. Thus, the sensitivity toward the lateral movement is reduced in the automated driving level change setting while the self-vehicle is traveling on a lane on the outer circumference side of the curve. Since the vehicle tends to move toward the inner side on a curve, it will be set so that a larger lateral movement amount threshold of the preceding vehicle will be tolerated and the lowering of the automated driving level will be difficult when the vehicle is traveling, particularly, on the outer side of the curve than when the vehicle is traveling on a straight lane. Hence, in a curve in which the lateral movement of a vehicle tends to occur even when the vehicle has no intention to change lanes or the like, the stability of automated driving can be improved by setting an arrangement in which alerts to the driver will hardly occur. Note that the reason why the threshold value is not changed when the lane is on the inner circumference side of the curve is because it is considered that the radius will be smaller than when the lane is on the outer circumference side of the curve and that the driver will need to pay more attention when traveling in such a state. In addition, as a variation of this embodiment, a standard threshold may be set in step S515 if the lane is on the outer circumference side of the curve and a small threshold may be set in step S517 if the lane is on the inner circumference side of the curve. Alternatively, a large threshold may be set in step S515 if the lane is on the outer circumference side of the curve and a small threshold may be set in step S517 if the lane is on the inner circumference side of the curve.

Fourth Embodiment

The fourth embodiment differs from the first embodiment in the way in which the lateral movement amount threshold is set. In this embodiment, the lateral movement amount threshold is determined by adopting, among the reference determination processes performed in the procedure of FIG. 4 according to the first embodiment, the fact that the lane on which the vehicle is currently traveling on is adjacent to the shoulder of the road or another travel lane as a reference. Processes corresponding to the processes of steps S413 to S419, step S423, step S425, and step S411 of FIG. 4 are executed in FIG. 6A. However, if it is determined that the preceding vehicle has not moved rightward in step S617 (corresponding to step S411), a standard threshold will be set as the lateral movement amount threshold (step S619). As a result, in a state in which it can be predicted that the preceding vehicle will stop on the shoulder of the road, it becomes possible to alert the driver of this prediction earlier to cause the driver to prepare for the end of the vehicle following travel operation. Furthermore, it becomes possible to predict the lane change of the preceding vehicle earlier and alert the driver to cause driver to respond accordingly.

Fifth Embodiment

Figure 6A:
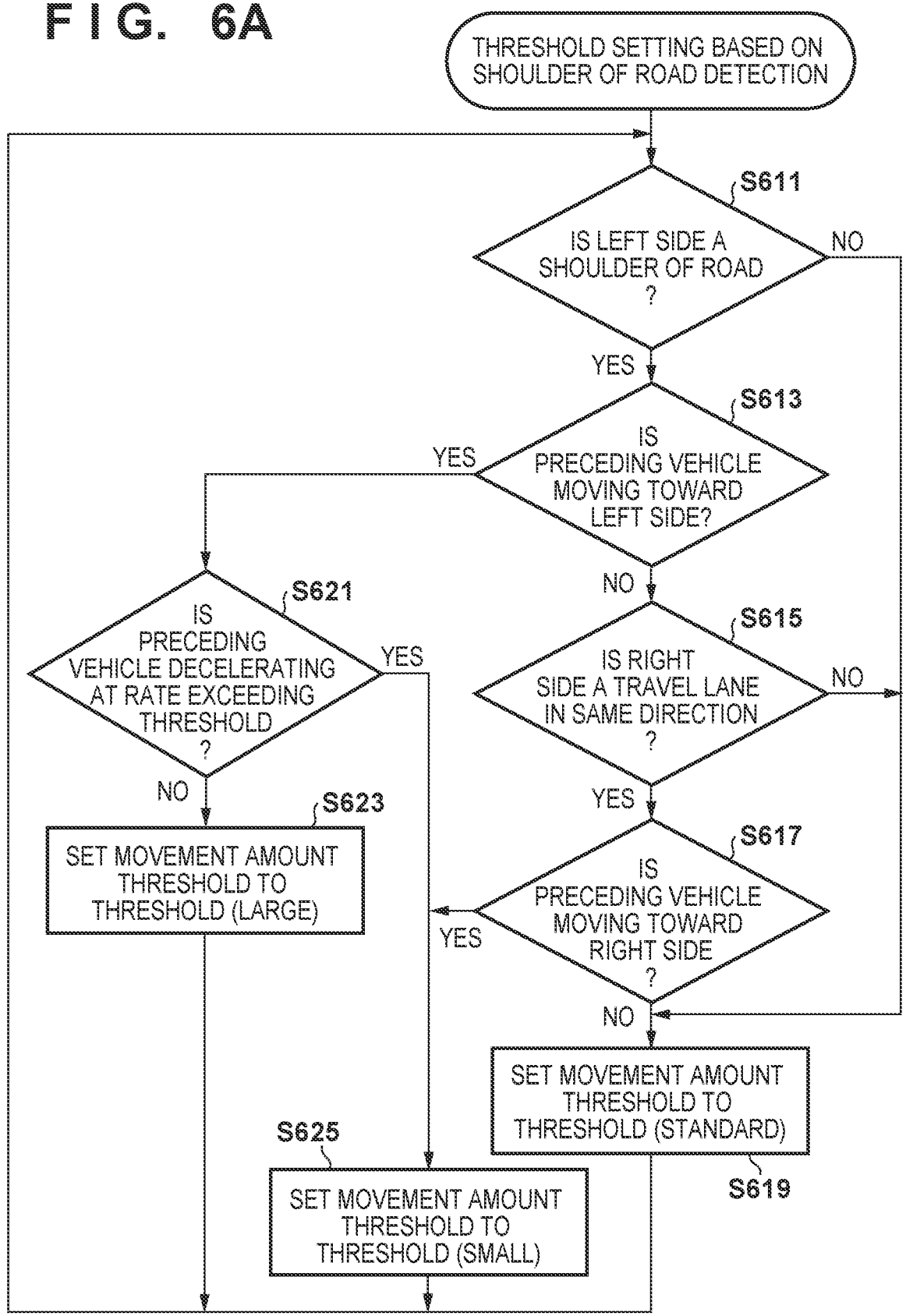
FIG. 6A is a flowchart showing lateral movement threshold setting processing according to the fourth embodiment.
Figure 6B:
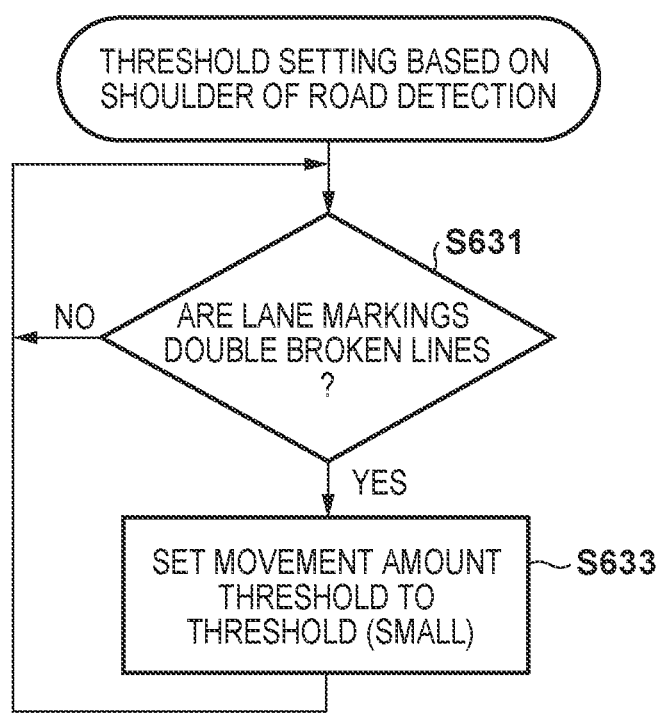
FIG. 6B is a flowchart showing lateral movement threshold setting processing according to the fifth embodiment.

The fifth embodiment differs from the first embodiment in the way in which the lateral movement amount threshold is set. In this embodiment, the lateral movement amount threshold is set according to the procedure shown in FIG. 6B. In FIG. 6B, after obtaining information related to the peripheral state first, whether the lane markings are double broken lines is determined (step S631). If the lane markings are double broken lines, a smaller threshold is set as the lateral movement amount threshold (step S633). As a result, it is possible to estimate the possibility that the preceding vehicle will change lanes at an earlier time, and prompt the driver to be in the hands-on state so that the driver can quickly respond when the vehicle following travel operation is ended. Alternatively, it may be arranged so that a lateral movement amount threshold corresponding to the lane width will be set by executing a process corresponding to the process of step S415 of FIG. 4. Note that the reference for setting the lateral movement amount threshold is not limited to that described above. It may be arranged so that the automated driving level will be changed to the hands-on state at an earlier time by detecting a movement that can predict a lane change or a stop or, on the other hand, arranged so that the automated driving level permitting the hands-off state will be maintained by detecting a state that is difficult for a lane change or stop to occur.

Other Embodiments

The above embodiments described an example in which an appropriate automated driving level change is implemented not by setting a fixed threshold, but by changing the threshold in accordance with the peripheral environment such as the road on which the vehicle is currently traveling on to alert the driver earlier or to suppress, on the other hand, the alerting operation from occurring too frequently. As a modification, in a case in which the following pieces of information are present, these pieces of information may be prioritized and the determination threshold of the lateral movement amount of the preceding vehicle may be reduced. As a method of reducing the threshold, for example, it is possible to sequentially reduce the threshold stepwise if the threshold is to be set stepwise.

1) Current Lane+Lane Reduction Information Due to Roadwork on Adjacent Lane+Corresponding Road Sign:

This information can be obtained from images captured by, for example, cameras 41 or by communication. This information can also be obtained when a guard rail is recognized by LIDARs 42 and it is recognized that the lane is decreasing due to this guard rail. The threshold will be reduced because the driver will need to pay attention particularly to the lateral movement of the preceding vehicle when the width of the road is reduced.

2) Case in which Road Shape has (Small) Width which is Equal to or Less than Predetermined Width:

This information is information obtained, for example, from cameras, LIDARs, or a map. The threshold will be reduced by one step if the road width becomes equal to or less than a predetermined width. The threshold will be reduced for a reason similar to that of (1).

3) Threshold Based on Speed Limit Information:

This information is obtained from, for example, a road sign captured by the cameras and from the map information. In this case, if the speed limit information indicates "low vehicle speed", the lane departure of the preceding vehicle is detected accurately by setting a low threshold. Note that a predetermined speed may be set for this "low vehicle speed" and the threshold may be reduced by one step if the current speed becomes lower than the predetermined speed. For example, since an environment in which the road width is small due to a curve or the like requires more attention, the speed limit tends to decrease. Hence, the driver will need to pay attention particularly to the lateral movement of the preceding vehicle.

4) Road Sign Indicating Lane Reduction:

This information can be obtained from, for example, images captured by cameras, a map, and the like. For example, if a road sign indicating the end of the right lane is detected while the vehicle is traveling on the left lane of one half of a four-lane road, the threshold is changed to a smaller threshold so that a lateral movement toward the right will be detected more easily. This applies to the left lane in a similar manner.

In this manner, even in a case in which information indicating the lane reduction or width reduction of a road or information predicting such reductions is obtained, the threshold for decreasing the automated driving level of the self-vehicle with respect to the lateral movement of the preceding vehicle can be reduced based on this so that the driver will be alerted at an earlier timing.

Summary of Embodiments

As described above, the threshold of the behavior amount, that is, the threshold of the lateral movement amount of the preceding vehicle can be changed based on pieces of information indicating the road shape of the current lane, the state of the adjacent lane, and the type of lane markings or based on at least one of these pieces of information. As a result, it becomes possible to suppress excessive driving state shifts based on the road environment and to provide a stable automated driving operation.

(1) According to the first aspect of the present invention, a vehicle control apparatus provides a vehicle control apparatus characterized by comprising:

an obtainment unit configured to obtain peripheral information which includes at least one of a lateral movement of a preceding vehicle, a shape of a road, a state of a road adjacent to the road, and lane markings; and a controller configured to perform following control of following the preceding vehicle based on the peripheral information, wherein the controller controls traveling of a self-vehicle by setting one of a first driving state which requires driving preparation by a driver and a second driving state which does not require the driving preparation by the driver, controls the self-vehicle by setting the first driving state if a behavior amount of the preceding vehicle exceeds a predetermined threshold, and controls the vehicle by setting the second driving state if the behavior amount of the preceding vehicle does not exceed the predetermined threshold, and changes the predetermined threshold based on pieces of information indicating the shape of the road on which the self-vehicle is traveling, the state of the road adjacent to the road, and one of lane reduction and width reduction of the road or based on at least one of these pieces of information.

As a result, excessive shifts can be suppressed based on the road environment, and a stable automated driving operation can be provided.

(2) According to the second aspect of the present invention, a vehicle control apparatus provides the vehicle control according to (1), characterized in that the shape of the road is indicated by a curvature of a curve, and in a case in which the curvature is large, the controller sets the predetermined threshold to be smaller than the predetermined threshold in a case in which the curvature is small.

As a result, lane departure that occurs when the self-vehicle travels a curve can be detected earlier so that the state of the self-vehicle can be shifted.

(3) According to the third aspect of the present invention, a vehicle control apparatus provides the vehicle control apparatus according to (1) or (2), characterized in that the shape of the road is indicated by whether the road is on an inner circumference side or on an outer circumference side of a curve, and the controller sets the predetermined threshold to be smaller when the road is on the inner circumference side of the curve than when the road is on the outer circumference side of the curve.

As a result, lane departure to the inner circumference side of the curve will be tolerated and a stable automated driving operation can be provided.

(4) According to the fourth aspect of the present invention, a vehicle control apparatus provides the vehicle control apparatus according to any one of (1) to (3), characterized in that the state of the road adjacent to the road is a state in which one side of a lane on which the self-vehicle is traveling on is another travel lane and the other side of the lane on which the self-vehicle is traveling on is a shoulder of the road, and the controller decreases the predetermined threshold in a case in which the preceding vehicle is to move to the one side of the lane and increases the predetermined threshold in a case in which the preceding vehicle is to move on the other side of the lane.

As a result, the movement of the preceding vehicle to the shoulder of the road can be detected more quickly than the movement of the preceding vehicle to the adjacent lane.

(5) According to the fifth aspect of the present invention, a vehicle control apparatus provides the vehicle control apparatus according to (4), characterized in that the controller decreases the predetermined threshold if the preceding vehicle has decelerated in the case in which the preceding vehicle is to move to the other side of the lane.

As a result, it is possible to estimate from the deceleration state of the preceding vehicle whether the movement of the preceding vehicle to the shoulder of the road is intentional.

(6) According to the sixth aspect of the present invention, a vehicle control apparatus provides the vehicle control apparatus according to any one of (1) to (5), characterized in that in a case in which a lane marking of a lane on which the self-vehicle is traveling on is a double broken line, the controller sets the predetermined threshold to be smaller than the predetermined threshold in a case in which the lane marking of the lane is not the double broken line.

As a result, the lane change of the preceding vehicle can be detected at an early timing when the possibility that the lateral movement of the preceding vehicle is an intentional lateral movement such as lane change is high.

(7) According the seventh aspect of the present invention, a vehicle control apparatus provides the vehicle control apparatus according to any one of (1) to (5), characterized in that in a case in which a lane marking of a lane on which the self-vehicle is traveling on is not a broken white line, the controller sets the predetermined threshold to be smaller than the predetermined threshold in a case in which the lane marking of the lane is the broken white line.

As a result, the lane change of the preceding vehicle can be detected at an early timing when the possibility that the lateral movement of the preceding vehicle is an intentional lateral movement such as lane change is high.

(8) According to the eighth aspect of the present invention, a vehicle control apparatus provides the vehicle control apparatus according to any one of (1) to (7), characterized in that in a case in which a distance between lane markings sandwiching a lane on which the self-vehicle is traveling on is large, the controller sets the predetermined threshold to be larger than the predetermined threshold in a case in which the distance between the lane markings sandwiching the lane is small.

As a result, a large lateral movement can be tolerated when the width of the lane is large to maintain a stable driving state.

The present invention is not limited to the above embodiments, and various changes and modifications can be made within the spirit and scope of the present invention. Therefore, to apprise the public of the scope of the present invention, the following claims are made.

What is claimed is:

1. A vehicle control apparatus comprising:
   obtainment means for obtaining peripheral information which includes at least one of a lateral movement of a preceding vehicle, a shape of a road, a state of a road adjacent to the road, and lane markings; and
   one or more processors and one or more memories comprising one or more programs, wherein the one or more programs are configured to cause the one or more processors to:
   perform following control of following the preceding vehicle based on the peripheral information,
   wherein
   traveling of a self-vehicle is controlled by setting one of a first driving state which requires a driving task by a driver and a second driving state which reduces the driving task by the driver,
   the self-vehicle is controlled by setting the first driving state if a behavior amount of the preceding vehicle exceeds a predetermined threshold, and controls the vehicle by setting the second driving state if the behavior amount of the preceding vehicle does not exceed the predetermined threshold,
   the predetermined threshold is changed based on pieces of information indicating the shape of the road on which the self-vehicle is traveling, the state of the road adjacent to the road, and one of lane reduction and width reduction of the road or at least one of these pieces of information,
   the shape of the road is indicated by a curvature of a curve, and
   in a case in which the curvature is large, the predetermined threshold is set to be smaller than the predetermined threshold in a case in which the curvature is small.

2. The apparatus according to claim 1, wherein the driving task includes a steering wheel operation, and
   upon transitioning to the second driving state,
   whether or not the steering wheel operation is performed within a determined period of time is detected, and an avoidance operation is performed if the steering wheel operation is not detected.

3. The apparatus according to claim 1, wherein the shape of the road is indicated by whether the road is on an inner circumference side or on an outer circumference side of a curve, and
   the predetermined threshold is set to be smaller when the road is on the inner circumference side of the curve than when the road is on the outer circumference side of the curve.

4. The apparatus according to claim 1, wherein the state of the road adjacent to the road is a state in which one side of a lane on which the self-vehicle is traveling on is another travel lane and the other side of the lane on which the self-vehicle is traveling on is a shoulder of the road, and
   the predetermined threshold is decreased in a case in which the preceding vehicle is to move to the one side of the lane and increases the predetermined threshold in a case in which the preceding vehicle is to move on the other side of the lane.

5. The apparatus according to claim 4, wherein the predetermined threshold is decreased if the preceding vehicle has decelerated in the case in which the preceding vehicle is to move to the other side of the lane.

6. The apparatus according to claim 1, wherein in a case in which a lane marking of a lane on which the self-vehicle is traveling on is a double broken line, the predetermined threshold is set to be smaller than the predetermined threshold in a case in which the lane marking of the lane is not the double broken line.

7. The apparatus according to claim 1, wherein in a case in which a lane marking of a lane on which the self-vehicle is traveling on is not a broken white line, the predetermined threshold is set to be smaller than the predetermined threshold in a case in which the lane marking of the lane is the broken white line.

8. The apparatus according to claim 1, wherein in a case in which a distance between lane markings sandwiching a lane on which the self-vehicle is traveling on is large, the predetermined threshold is set to be larger than the predetermined threshold in a case in which the distance between the lane markings sandwiching the lane is small.

9. The apparatus according to claim 1, wherein, in both the first driving state and the second driving state, the following control is performed to follow a preceding vehicle travelling in the same lane as the self-vehicle.

* * * * *